(12) United States Patent
Berg et al.

(10) Patent No.: US 7,680,574 B2
(45) Date of Patent: Mar. 16, 2010

(54) VEHICLE INFORMATION SYSTEM WITH STEERING WHEEL CONTROLLER

(75) Inventors: Frederick J. Berg, Auburn, MI (US); Timothy J. Bennett, Kawkawlin, MI (US); Alan C. Davis, Fenton, MI (US); Richard K. Riefe, Saginaw, MI (US); Ronald H. Dybalski, Oxford, MI (US); Timothy M. Phillips, Fenton, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 1202 days.

(21) Appl. No.: 11/239,876

(22) Filed: Sep. 30, 2005

(65) Prior Publication Data

US 2006/0155441 A1 Jul. 13, 2006

Related U.S. Application Data

(63) Continuation-in-part of application No. 10/793,193, filed on Mar. 4, 2004, now abandoned.

(51) Int. Cl.
*B62D 6/00* (2006.01)

(52) U.S. Cl. .............................. 701/41; 701/42; 701/36; 345/173

(58) Field of Classification Search ............ 340/426.31; 701/41, 42, 36, 49; 345/156, 173
See application file for complete search history.

(56) References Cited

U.S. PATENT DOCUMENTS

| | | | | |
|---|---|---|---|---|
| 4,630,043 A | * | 12/1986 | Haubner et al. | 340/825.57 |
| 5,091,856 A | | 2/1992 | Hasegawa et al. | 364/424.05 |
| 5,555,502 A | * | 9/1996 | Opel | 701/36 |
| 6,253,131 B1 | * | 6/2001 | Quigley et al. | 701/36 |
| 6,373,472 B1 | * | 4/2002 | Palalau et al. | 345/173 |
| 6,418,362 B1 | * | 7/2002 | St. Pierre et al. | 701/36 |
| 6,427,115 B1 | | 7/2002 | Sekiyama | 701/208 |
| 6,563,487 B2 | * | 5/2003 | Martin et al. | 345/156 |

(Continued)

OTHER PUBLICATIONS

TouchSense Programmable Rotary Modules; Immersion.

(Continued)

*Primary Examiner*—Thomas G Black
*Assistant Examiner*—Wae Louie
(74) *Attorney, Agent, or Firm*—Cantor Colburn LLP (57) ABSTRACT

An information system for a vehicle includes a computer for handling informational data corresponding to operation of the vehicle. A primary display is connected to the computer in a position to be viewed by a driver of the vehicle for presenting the informational data in multiple, sequential, interactive menu screens. A manual controller mounted on the steering wheel allows input to the computer and manipulation of the primary display through the menu screens. The controller includes a scroll wheel which is oriented so that its rotational axis is parallel to the steering axis. The controller includes a central push button for activating a particular selection highlighted on the primary display. A plurality of category selector buttons operate as mode switches for activating various vehicle system subjects through the information system. The scroll wheel and push button selectors establish an interface for the driver which can be operated intuitively, without taking eyes off the road or releasing the driver's grip of the steering wheel.

30 Claims, 4 Drawing Sheets

U.S. PATENT DOCUMENTS

| | | | |
|---|---|---|---|
| 6,636,197 B1 | 10/2003 | Goldenberg et al. | 345/156 |
| 6,693,626 B1* | 2/2004 | Rosenberg | 345/168 |
| 6,859,687 B2* | 2/2005 | Obradovich et al. | 701/1 |
| 7,020,499 B2* | 3/2006 | Moffi et al. | 455/569.1 |
| 7,062,365 B1* | 6/2006 | Fei | 701/36 |
| 2003/0088352 A1 | 5/2003 | Bullinger et al. | 701/41 |
| 2003/0109290 A1* | 6/2003 | Moffi et al. | 455/569 |
| 2005/0030166 A1* | 2/2005 | Kraus et al. | 340/407.1 |
| 2006/0155441 A1* | 7/2006 | Berg et al. | 701/41 |
| 2006/0282204 A1* | 12/2006 | Breed | 701/49 |

OTHER PUBLICATIONS iDrive Console; BWM Technology; www.bmwworld.com/technology/idrive.htm.

* cited by examiner

VEHICLE INFORMATION SYSTEM WITH STEERING WHEEL CONTROLLER

RELATED APPLICATIONS

This is a continuation in part of U.S. patent application Ser. No. 10/793,193 filed Mar. 4, 2004 now abandoned.

FIELD OF THE INVENTION

The subject invention relates generally to an information system for a vehicle, and specifically to a controller for an information system mounted on a steering wheel used to manipulate information presented on a display.

BACKGROUND OF THE INVENTION

Information systems for vehicles have been proposed in which a computer connected to various systems of the vehicle is used to present system information and allow a driver to interact with the various systems. The computer is connected to an input device for receiving manual inputs from a driver of the vehicle, and a display that is viewable by the driver. In keeping with modern computer operating systems, the display presents the system information through multiple, sequential, interactive menus and submenus which take a driver from general to specific levels of information and control. The driver uses the input device in conjunction with the display menus to review vehicle information and adjust any adjustable settings.

Various input devices have been proposed for this application, including keyboard arrangements, push button interfaces, and multi-function joystick controllers. A primary disadvantage of these prior art input devices resides in the fact that a driver must remove his hands from a controlling grip on the steering wheel in order to manipulate the input device. These prior art systems also inadvertently urge the driver to direct his gaze toward the input device to make sure that the controls are actuated properly. Because a steering wheel is always turning, placement of the input device on the steering wheel has not been favorably received for multi-function information system applications. The "real estate" of a steering wheel is by nature a moving plane of reference. Most types of prior art input devices would be difficult for a driver to operate from a steering wheel mounted position without looking at either the controller or the display screen to see if he has moved the controller in the right direction or manipulated the controller in the intended manner.

There exists a need for a vehicle information system of the type that displays informational data to the driver in multiple, sequential, interactive presentations which does not require the driver to remove his hands from a controlling grip on the steering wheel, and is more conducive to blind manipulation, i.e., by tactile senses and without looking directly at the input device or the display screen.

SUMMARY OF THE INVENTION AND ADVANTAGES

A vehicle information system is of the type having a steering wheel mounted controller. The system comprises a primary display permanently affixed to the vehicle in a position to be viewed by a driver of the vehicle for displaying informational data to the driver in multiple, sequential, interactive presentations. A steering wheel is supported for rotation about a steering axis. A manual controller is supported on the steering wheel for changing the informational data and initiating vehicle system changes in response to manual inputs from the driver. The controller includes a scroll wheel rotatably carried about a scroll axis. The scroll axis is fixed relative to, and movable with, the steering wheel so that driver manipulation of the informational data through the multiple, sequential, interactive presentations can be accomplished easily and without releasing the driver's grip of the steering wheel.

By devising the manual controller with a rotating scroll wheel, and fixing the rotational scroll axis of the scroll wheel relative to the steering wheel, it is easier for a driver to operate the information system blind, i.e., by tactile senses alone and without taking eyes off the road. This unique application of a rotating scroll wheel, which is mounted directly to the steering wheel, overcomes the prior art deficiencies.

According to another aspect of the invention, a steering wheel is mounted for rotation in a vehicle of the type including a primary display permanently affixed in a position to be viewed by a driver of the vehicle for displaying informational data to the driver in multiple, sequential, interactive presentations. The steering wheel comprises a hub supported for rotation about a steering axis. A rim is provided, along with at least one spoke interconnecting the hub and the rim. A manual controller is supported on either the rim or the hub for the purpose of changing informational data and initiating vehicle system changes in response to a manual input from the driver. The controller includes a scroll wheel rotatably carried about a scroll axis. The scroll axis is fixed relative to and is movable with the steering wheel so that driver manipulation of the informational data through the multiple, sequential, interactive presentations can be accomplished easily and without releasing the driver's grip of the steering wheel. A haptic actuator is provided for creating selective resistance to rotation of the scroll wheel about the scroll axis. The haptic actuator is capable of enhancing the tactile characteristics of the controller, thereby making it easier for a driver to operate the controller without taking eyes off the road.

Yet another aspect of the invention comprises a method for a driver to change and interact with informational data presented on a primary display in a vehicle without removing his hands from the steering wheel. The method comprises the steps of supporting a steering wheel in the vehicle for rotation about a steering axis, displaying informational data to the driver in multiple, sequential, interactive presentations on the primary display, and manually changing the informational data while the driver's hands are able to clutch the steering wheel. The step of manually changing the informational data includes rotating a scroll wheel about a scroll axis that is fixed relative to the steering wheel. This unique arrangement of manually changing the informational data by rotating a scroll wheel about an axis that is immovable relative to the steering wheel results in a control methodology which allows a driver to more easily operate and interact with the informational data presented on the primary display without taking eyes off the road.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
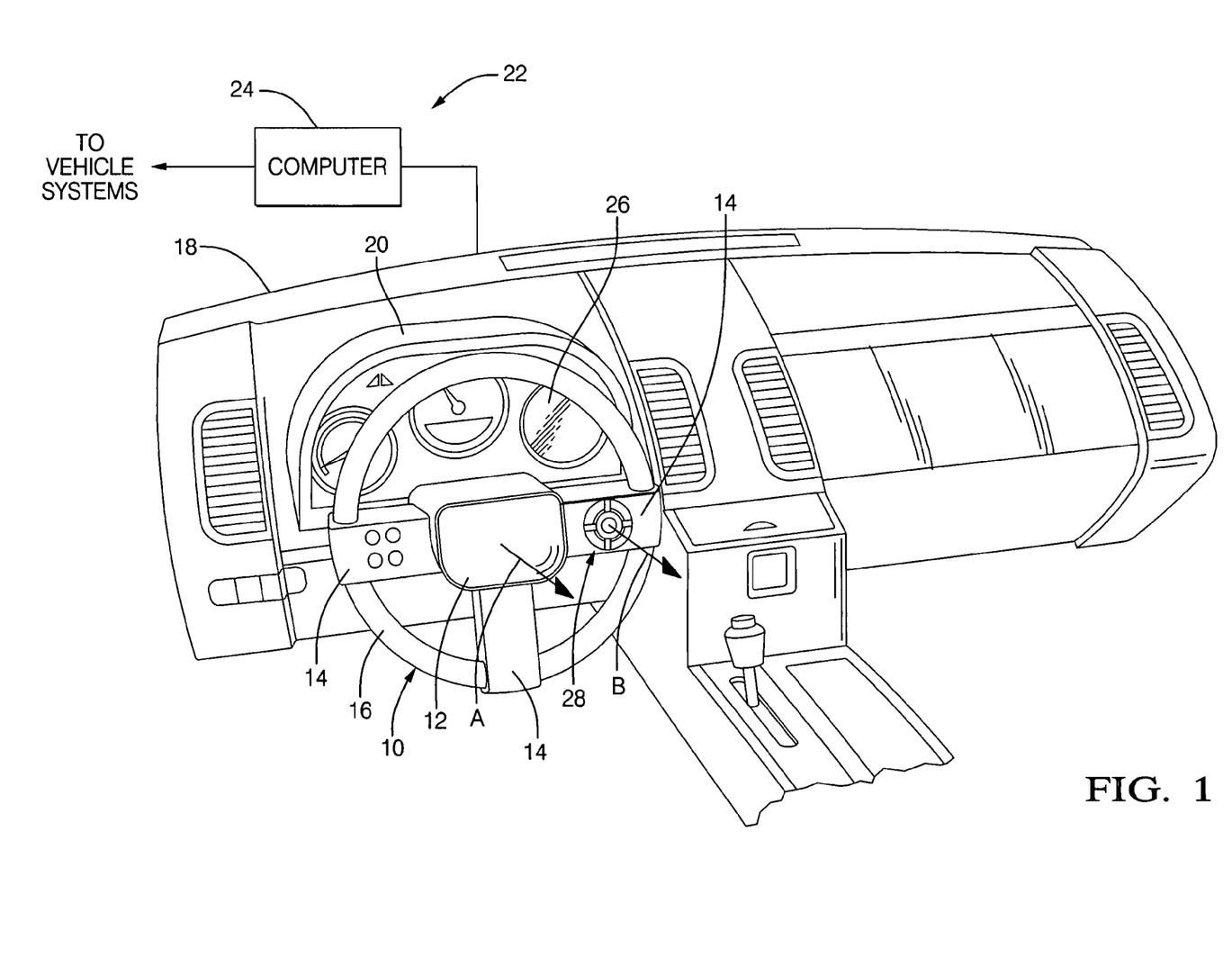
FIG. 1 is a perspective view of a driver's position in the vehicle including a primary display and a controller mounted on the steering wheel.

Referring to the Figures, wherein like numerals indicate like or corresponding parts throughout the several views, a driver's view of a vehicle interior is shown in FIG. 1. The vehicle includes a steering wheel, generally indicated at 10, which is comprised of a hub 12, three radially extending spokes 14 and a rim 16 carried by the spokes 14. Of course, steering wheel configurations can vary widely between vehicles, and the specific hub, spoke and rim arrangement depicted here is merely exemplary. The hub 12 is supported for rotation at the end of a steering column (not shown) for rotation about a steering axis A. Thus, the steering wheel 10, as a unit, rotates about the steering axis A in response to manual inputs from the driver. Typically, a driver grasps the rim 16 and/or the spokes 14 to control the direction of the vehicle. The steering wheel 10 is mounted in front of a dashboard, generally indicated at 18. The dashboard 18 includes an instrument panel 20 presenting important driving information through gauges, screens, and various indicators.

An information system for the vehicle is generally indicated at 22 in FIG. 1. The information system 22 operates in addition to, or in lieu of, other instruments and control features in the vehicle. The information system 22 includes a computer 24 for handling informational data, including vehicle data. The computer 24 also includes other necessary electronic components known to those skilled in the art, such as a memory, a hard drive, communication interfaces, a power supply/converter, digital and analog converters, etc. The computer 24 is connected to vehicles systems that provide the vehicle data which corresponds to the operation of the vehicle and associated vehicle systems. Examples of these vehicle systems, include, but are not limited to, an engine controller, a climate control system, an integrated cellular phone system, a sound system (radio), a global positioning system (GPS) receiver, and a video entertainment center (such as a DVD player). Examples of vehicle data provided by the vehicle systems include, but are not limited to, vehicle speed, engine RPM, engine oil pressure, engine coolant temperature, battery voltage, vehicle maintenance reminders, climate control system settings, outside temperature, radio settings, integrated cellular phone settings, compass headings, video images, sound files, digital radio broadcasts, and navigational information.

The informational data handled by the computer 24 can also include external data from a network external to the vehicle. In this case, an external wireless interface would be operatively connected to the computer 24 to communicate with the network for sending and receiving external data. External data may include, but is not limited to, internet web pages, email, and navigational information.

The information system 22 includes a primary display 26 permanently affixed to the vehicle in a position to be viewed by the driver. As shown in FIG. 1, the primary display 26 can be integrated into the instrument panel 20. However, the primary display 26 can alternatively be located in other areas of the dashboard 18, in a sun visor, projected on a windshield as a "head-up" display, or other suitable locations. The primary display 26 is operatively connected to the computer 24 for displaying the informational data to the driver in multiple, sequential and interactive menu/interface screens.

The information system 22 also includes a manual controller, generally indicated at 28, which is operatively connected to the computer 24. The controller 28 allows the driver to send commands to the computer 24 for the purpose of changing the information data on the primary display 26, i.e., navigating through menu interfaces and initiating vehicle system changes in response to a manual input from the driver. The information system 22 is therefore structured to present, on the primary display 26, multiple, sequential, interactive presentations through which the driver navigates to arrive at specific information he wishes presented, or to enter a mode in which specific system changes can be effected. This menu-driven method requires the driver to interact with the information system 22 through the controller 28.

Figures 2, 3:
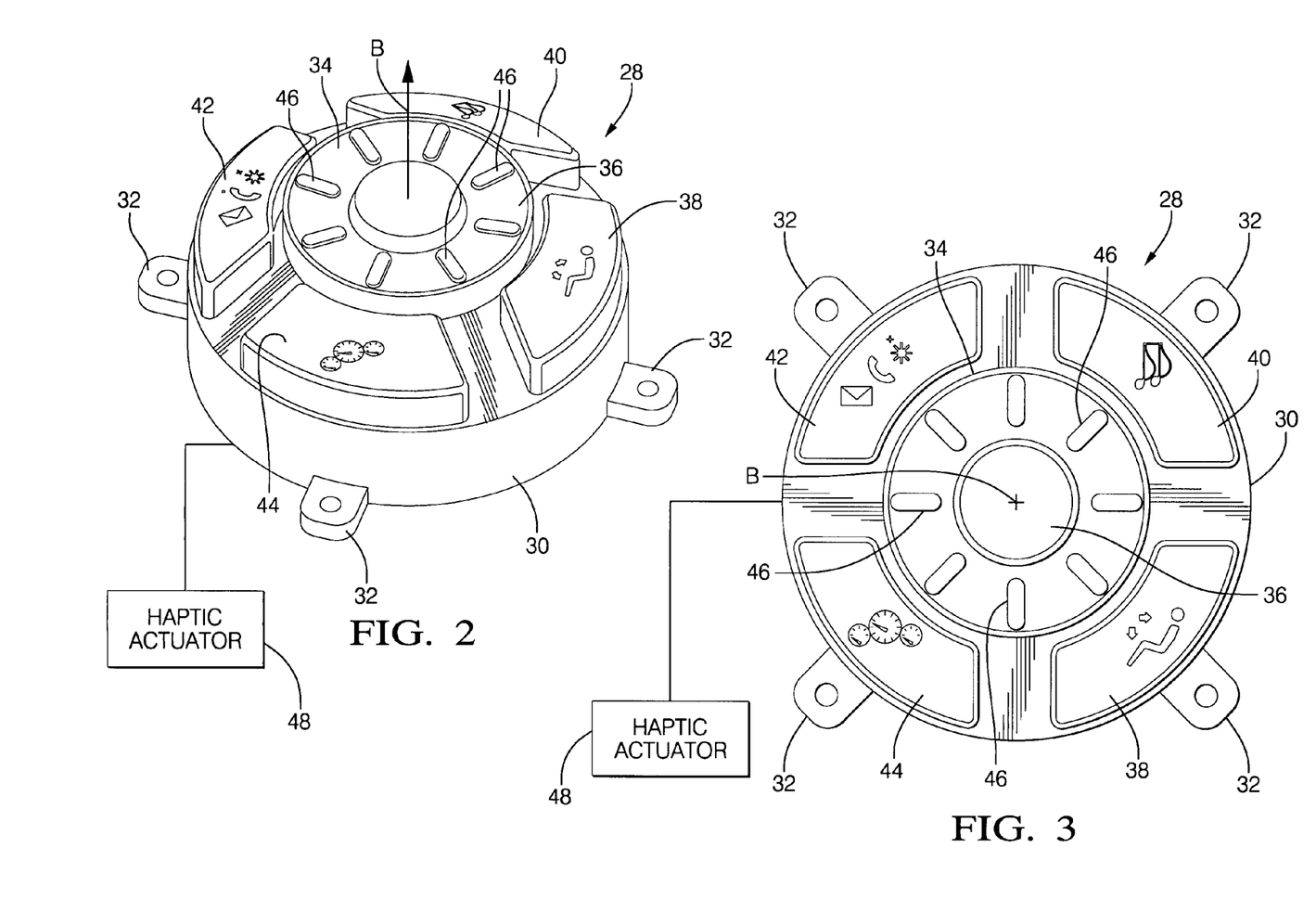
FIG. 2 is a perspective view of the steering wheel mounted controller according to the subject invention.
FIG. 3 is a top view of the controller in FIG. 2.

The controller 28 is best shown in FIGS. 2 and 3 including a housing 30 which is fixed to a spoke 14 of the steering wheel 10. However, the housing 30 can be located on the hub 12 or rim 16 with equal effect. The housing 30 may include mounting tabs 32 or other suitable structures for securely affixing the controller 28 in a position readily accessible to the driver without requiring release of the driver's grip from the steering wheel 10. A scroll wheel 34 is rotatably carried in the housing 30 for rotation about a scroll axis B. The scroll axis B is fixed relative to the steering wheel 10 such that it cannot be moved and its orientation is predictably consistent for the benefit of the driver.

Preferably, but not necessarily, the scroll axis B is oriented generally parallel to the steering axis A as shown in FIG. 1. In this configuration, the rotational direction, i.e., clockwise or counter-clockwise, of the scroll wheel 34 remains absolutely consistent regardless of the turning position of the steering wheel 10. Thus, even while the steering wheel 10 is rotated through its various positions, and may be tilted if the steering column is so fitted, the clockwise and counter-clockwise rotary directions of the scroll wheel 34, relative to the steering axis A, do no change. By this means, a driver may manipulate the informational data presented on the primary display 26 without sacrificing a controlling grip of the steering wheel 10. Furthermore, the scroll wheel 34 allows a driver to more easily operate the information system 22 without taking eyes off the road, because the simple turning (clockwise or counter-clockwise) motion is intuitive and repetitively consistent. Accordingly, the multiple, sequential, interactive presentations on the primary display 26 can be intuitively navigated through the sense of touch alone as soon as the driver becomes familiar with the display sequences.

The controller 28 also includes a central push button selector 36 which preferably, but not necessarily, is disposed within the scroll wheel 34 and centered along the scroll axis B. The central push button 36 operates like an "Enter" button and is used in conjunction with the scroll wheel 34 to allow the driver to navigate and control the primary display 26. A plurality of category selector buttons 38, 40, 42, and 44 are supported in the housing 30 adjacent the scroll wheel 34. For aesthetic as well as ergonomic purposes, the category selector buttons 38-44 can be arranged in generally equal radial and circumferential increments about the scroll axis B, thus establishing four quadrants whose positions remain fixed relative to the steering wheel 10 so that a driver can memorize their locations. The category selector buttons 38-44 are operative to initiate presentation of information data on the primary display 26 relating to different modes or categories of information. For example, the category selector button 38 may be related specifically to initiating presentation of vehicle climate control, or occupant comfort, aspects of the information system 22. The category selector button 40 may relate to the vehicle audio and/or video system. The category selector button 42 may relate primarily to the vehicle communication and navigation system, while the category selector button 44 may relate primarily to engine operating conditions and diagnostic aspects. More or fewer category selector buttons can be fitted and the specific category or mode associated with each button is a matter of design choice.

The scroll wheel 34 may be provided with optional features to enhance the tactile interaction for the benefit of the driver, all designed to make it easier for the driver to operate the controller 28 without taking eyes off the road. For example, a plurality of traction ribs 46 can be formed on the top and/or side surfaces of the scroll wheel 34 which not only enhance grip but also establish reference markers for the degree of rotation. A haptic actuator 48 may be incorporated for creating selective resistance to rotation of the scroll wheel 34 about the scroll axis B. The haptic actuator 48 can take any of the known forms and be structured according to any of the known techniques for providing haptic feedback effects to the scroll wheel 34. For example, U.S. Pat. No. 6,636,197 to Goldberg et al, granted Oct. 21, 2003 and assigned to Immersion Corporation, discloses a suitable haptic feedback system and methodology. The entire disclosure of the Immersion Corporation patent U.S. Pat. No. 6,636,197 is incorporated herein by reference. As will be described in detail below, the haptic actuator 48 preferably includes an association feature whereby a different resistive sequence is applied to the scroll wheel 34 depending upon the specific information data presented on the primary display 26.

Figure 4:
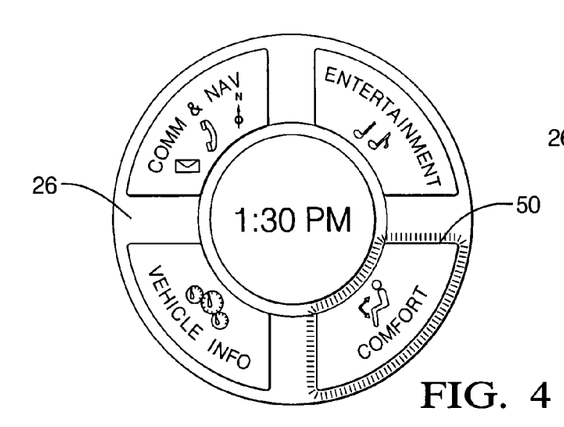
FIG. 4 is a view of an exemplary main menu presented on the primary display.

FIGS. 4 through 7 illustrate the primary display 26 as it might progress through multiple, sequential, interactive presentations. In FIG. 4, a main menu is presented in which time, temperature, or other interesting information is displayed centrally, along with a representative depiction of the various categories corresponding in shape and arrangement to the category selector buttons 38-44. When the driver wishes to interact with the information system 22, he begins by depressing a category selector button 38-44 associated with the information or operating system of interest. For example, if the driver wants to change the location and flow rate of conditioned air delivered through the HVAC system, he will first depress the category selector button 38 associated with the climate control features of the vehicle. As the category selector button 38 is depressed, the primary display 26 may create a highlight 50 associated with the comfort quadrant, as depicted in FIG. 4. The highlight 50 provides confirmation to the driver that the intended category selector button had been chosen.

Figure 5:
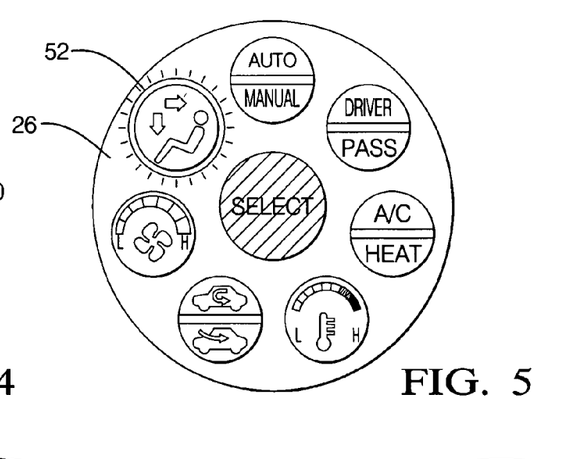
FIG. 5 is a view of an exemplary first submenu presented on the primary display after the comfort category selector button has been actuated.

This, in turn, causes the presentation on the primary display 26 to change and display a series of selections associated with the vehicle climate control system, as depicted in FIG. 5. Here, the driver is intuitively presented with information allowing the selection of various features of the climate control system which can be accessed through the information system 22. The scroll wheel 34 is rotated, and in so doing a visual highlight 52 moves about the display. The driver interactively manipulates the scroll wheel 34 until the highlight 52 has come to rest upon the specific activity or information of interest. In the example of FIG. 5, the highlight 52 is shown at rest upon the ventilation control feature. By depressing the central push button 36, the driver "selects" this menu feature whereupon a new menu display is presented in FIG. 6.

Figure 6:
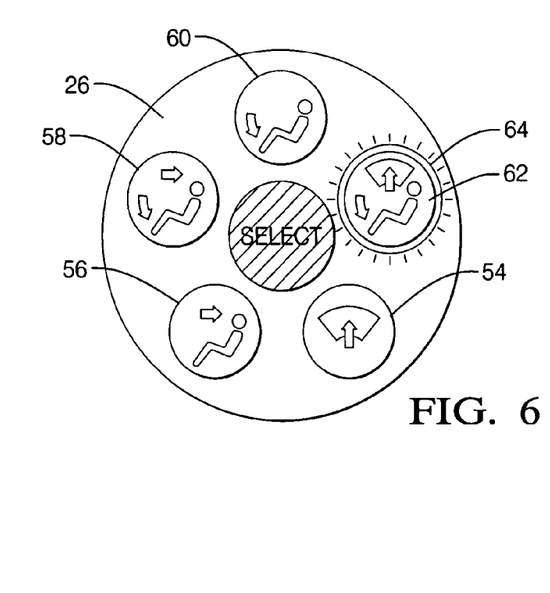
FIG. 6 is a view of an exemplary second submenu presented on the primary display after the vent control feature has been activated.

In FIG. 6, the various options available for discharge of conditioned air into the passenger compartment are presented. These include a defrost location 54, a dashboard location 56, a combination dashboard/floor location 58, a floor location 60, and a combination floor/defrost position 62. Again, a visual highlight 64 is controlled by the driver through the scroll wheel 34 until it comes to rest upon the desired selection. In this example, the floor/defrost location 62 is the intended feature. Upon depressing the central push button 36, the floor/defrost control settings are brought into view in a new submenu illustrated in FIG. 7.

Figure 7:
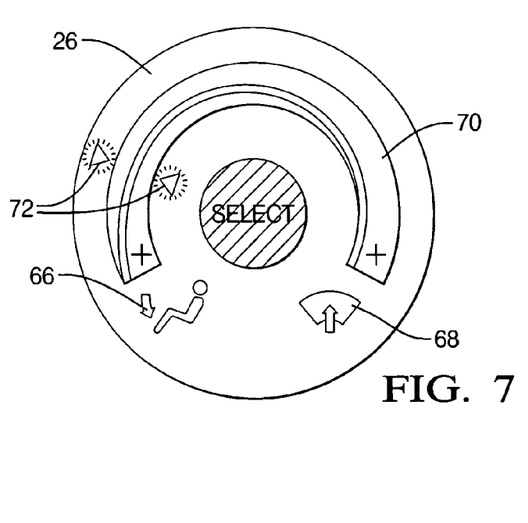
FIG. 7 is an exemplary third submenu presented on the primary display following activation of the floor and defrost selection as viewed in FIG. 6.

Here, the driver is invited to proportion the amount of air delivered between the floor 66 and defrost 68 registers. For this, a graphical representation which is intuitively descriptive to the driver will be displayed on the primary display 26. As an example, a representative graph 70 depicts the relative amounts of air which can be delivered between the floor 66 and defrost 68 positions. Pointers 72 move in response to, and in proportion to, the rotation of the scroll wheel 34. Thus, as the driver manipulates the scroll wheel 34 in the clockwise direction, the pointers 72 move in unison, and as if fixed on a radial, toward the right and thereby increase the proportion of air to the defrost position 68. Once the desired proportion has been reached, the driver stops rotating the scroll wheel 34 and depresses the center push button 36. This enters the selection, and returns the primary display 26 to the main menu represented in FIG. 4.

Figure 8A:
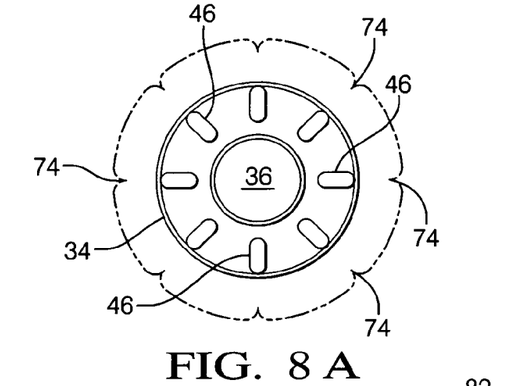
FIGS. 8A-E represent exemplary alternative resistive sequences that can be applied to the scroll wheel by a haptic actuator.

The haptic actuator 48 can be particularly effective in helping the driver navigate the various interactive screens with minimal distraction to the task of driving. Through the computer control features incorporated into the haptic actuator 48, various resistive sequences can be applied to the scroll wheel 34 which give the impression of mechanical attributes common in prior art control wheel features. For example, FIG. 8A represents, by the outer phantom lines, a series of detents 74 which will be felt by the driver as the scroll wheel 34 is rotated in either direction. The detents 74 can be programmed into the haptic actuator 48 to correspond precisely to the available selections presented on the primary display 26. Thus, in the example of FIG. 5, seven selections are possible. An association feature incorporated into the haptic actuator 48 could arrange a pattern of detents 74, like those shown in FIG. 8A, to correspond in number and arcuate position to each of the selections presented on the primary display 26. These detents 74 would thus be synchronized with the highlight 52 coming to rest upon a different selection option.

Then, when a different presentation is made on the primary display 26, the haptic actuator 48 can employ a different resistive sequence which is especially intuitively adapted to that presentation. For example, in FIG. 6, five selections 54-62 are possible and the detent pattern of FIG. 8A can be reconfigured by the incorporated logic features to provide detents 74 for each selection. Thus, if a driver can see upon glancing at the primary display 26, or remembers, that movement from the dash/floor position 58 to the floor/defrost position 62 is two "clicks" away in the clockwise direction, the scroll wheel 34 can be rotated, without looking, through two clicks of the felt detents 74 thus allowing the driver to confidently push the center push button 36 and know that his selection has been taken without the need to take his eyes from the road. The convenient location of the controller 28 upon the steering wheel 10 allows these manipulations to be accomplished without the driver releasing his controlling grip.

Figure 8B:
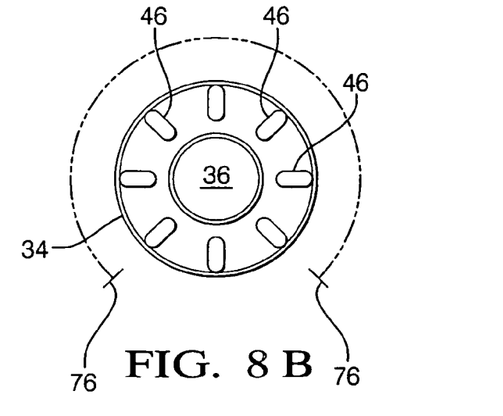

Other resistive sequences are of course possible. For example, FIG. 8B represents a resistive sequence in which stops 76 are imposed upon the rotation of the scroll wheel 34. The stops 76 could be arranged to correspond with each end of the graph 70 in FIG. 7. Thus, as the pointer 72 moves in an arcuate path about the graph 70, the scroll wheel 34 will stop rotating at each stop 76 which corresponds with the pointer 72 reaching either end of the graph 70. By this, the driver can use his tactile senses to interact with the vehicle climate control system.

Figure 8C:
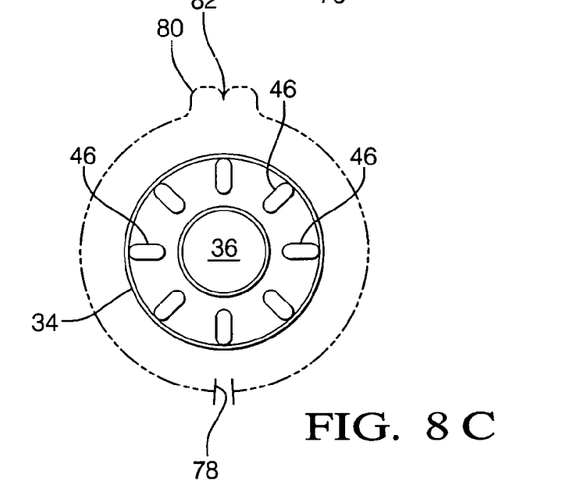

Of course, other resistive sequences are also possible. In the example of FIG. 8C, a stop 78 is established at the 6 o'clock position, so that the scroll wheel 34 is prevented from passing a full rotation. Here also, a central hump 80 with a small detent 82 at precisely the 12 o'clock position can be associated with various presentations on the primary display 26. As an example, this resistive sequence may be used to adjust the balance settings in the vehicle audio system.

Figure 8D:
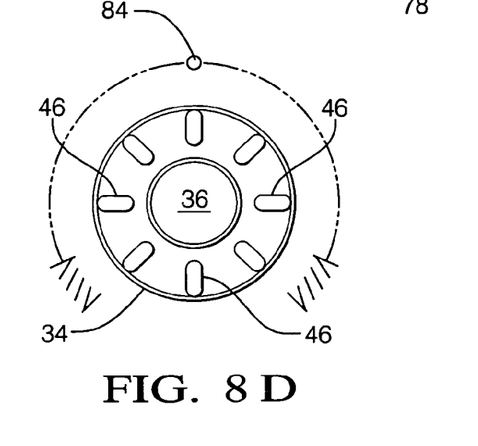

FIG. 8D represents a resistive sequence in which the tactile sensation of springs is applied to rotation of the scroll wheel 34, with a central home sensation 84 arranged at the 12 o'clock position. As the scroll wheel 34 is rotated in either direction away from the home position 84, increasing resistance is experienced. This type of feature may be especially advantageous in setting certain tonal qualities in the vehicle audio system, as but one example.

Figure 8E:
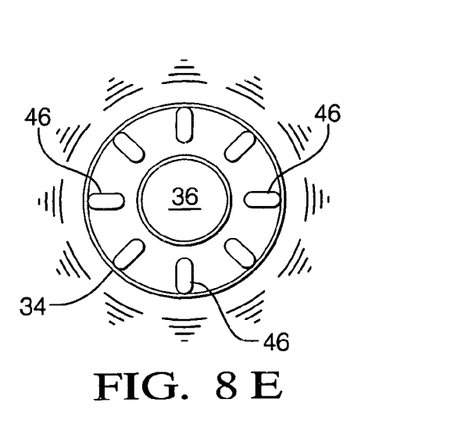

FIG. 8E represents a resistive sequence in which the scroll wheel 34 is vibrated or pulsed by the haptic actuator 48. Different vibration frequencies and pulse patterns can be established for different selections within the same display presentation. For example, in either FIG. 5 or FIG. 6, a different vibration pattern or frequency can be associated with each selection, so that as the highlight 50, 52 comes to rest upon a particular selection, the scroll wheel 34 will pulse or vibrate in an individualized or identifiable manner. Through repetitive use of the interactive information system 22, a driver will come to associate a given pulse or vibration pattern with a particular selection, so that navigation through the various screens and presentations can be accomplished entirely through touch and feel. The haptic actuator 48 can be further associated with an audible system, operated through the computer 24, which provides sounds, such as chimes, music, or recorded messages, as the various selections and screens are navigated through the scroll wheel 34.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle information system having a steering wheel mounted controller, said system comprising:
    a primary display disposed in the vehicle in a position to be viewed by a driver of the vehicle for displaying informational data to the driver in multiple, sequential, interactive presentations;
    a steering wheel supported for rotation about a steering axis;
    a manual controller supported on said steering wheel for changing the information data and initiating vehicle system changes in response to a manual input from the driver, said controller including a scroll wheel rotatably carried about a scroll axis, said scroll axis being fixed relative to said steering wheel so that driver manipulation of the informational data through the multiple, sequential, interactive presentations can be accomplished without releasing the driver's grip of the steering wheel; and
    a haptic actuator communicating with said controller, said scroll wheel having selective resistance to rotation about said scroll axis induced by said haptic actuator.

2. The system of claim 1, wherein said scroll axis is oriented generally parallel to said steering axis.

3. The system of claim 1, wherein said controller includes a push button selector.

4. The system of claim 3, wherein said push button selector is disposed within said scroll wheel.

5. The system of claim 3, wherein said controller includes a plurality of category selector buttons adjacent said scroll wheel.

6. The system of claim 5, wherein said plurality of category selector buttons are arranged in generally equal radial and circumferential increments about said scroll axis.

7. The system of claim 5, wherein one of said category selector buttons is operative to initiate presentation of information data on said primary display relating to a vehicle climate control.

8. The system of claim 5, wherein one of said category selector buttons is operative to initiate presentation of information data on said primary display relating to a vehicle audio system.

9. The system of claim 5, wherein one of said category selector buttons is operative to initiate presentation of information data on said primary display relating to a vehicle navigation system.

10. The system of claim 5, wherein one of said category selector buttons is operative to initiate presentation of information data on said primary display relating to an engine operating condition.

11. The system of claim 1, wherein said scroll wheel includes a plurality of traction ribs.

12. The system of claim 1, wherein said haptic actuator includes an association feature by which a different resistive sequence is applied to said scroll wheel depending upon the information data presentation on said primary display.

13. The system of claim 12, the impression of mechanical attributes imparted to said scroll wheel by a said resistive sequence applied to said controller.

14. A steering wheel mounted for rotation in a vehicle of the type including a primary display disposed in a position to be viewed by a driver of the vehicle for displaying informational data to the driver in multiple, sequential, interactive presentations, said steering wheel comprising:
    a hub supported for rotation about a steering axis;
    a rim;
    at least one spoke interconnecting said hub and said rim;
    a manual controller for changing information data and initiating vehicle system changes in response to a manual input from the driver;
    said controller including a scroll wheel rotatably carried about a scroll axis, said scroll axis being fixed relative to said hub, rim and spoke so that driver manipulation of the informational data through the multiple, sequential, interactive presentations can be accomplished without releasing the driver's grip of said steering wheel;

and a haptic actuator for creating selective resistance to rotation of said scroll wheel about said scroll axis.

15. The steering wheel of claim 14, wherein said haptic actuator includes an association feature whereby a different resistive sequence is applied to said scroll wheel depending upon the information data presentation on said primary display.

16. The steering wheel of claim 14, wherein said scroll axis is oriented generally parallel to said steering axis.

17. The steering wheel of claim 16, wherein said scroll wheel is mounted on said spoke.

18. The steering wheel of claim 14, wherein said controller includes a push button selector.

19. The steering wheel of claim 18, wherein said push button selector is disposed within said scroll wheel.

20. The steering wheel of claim 18, wherein said controller includes a plurality of category selector buttons adjacent said scroll wheel.

21. The steering wheel of claim 20, wherein said plurality of category selector buttons are arranged in generally equal radial and circumferential increments about said scroll axis.

22. The steering wheel of claim 20, wherein one of said category selector buttons is operative to initiate presentation of information data on said primary display relating to a vehicle climate control.

23. The steering wheel of claim 20, wherein one of said category selector buttons is operative to initiate presentation of information data on said primary display relating to a vehicle audio system.

24. The steering wheel of claim 20, wherein one of said category selector buttons is operative to initiate presentation of information data on said primary display relating to a vehicle navigation system.

25. The steering wheel of claim 20, wherein one of said category selector buttons is operative to initiate presentation of information data on said primary display relating to an engine operating condition.

26. The steering wheel of claim 14, wherein said scroll wheel includes a plurality of traction ribs.

27. A method for a driver to change and interact with informational data presented on a primary display in a vehicle without removing his hands from the steering wheel, said method comprising the steps of:
supporting a steering wheel in the vehicle for rotation about a steering axis;
displaying informational data to the driver in multiple, sequential, interactive presentations on the primary display;
manually changing the informational data while the driver's hands are able to clutch the steering wheel;
said step of manually changing the informational data including rotating a scroll wheel about a scroll axis that is fixed relative to the steering wheel;
and wherein said step of manually changing the informational data includes creating selective resistance to rotation of the scroll wheel about the scroll axis.

28. The method of claim 27, wherein said step of creating selective resistance to rotation of the scroll wheel includes applying a different resistive sequence to the scroll wheel depending upon the information data presentation on the primary display.

29. The method of claim 28, wherein said step of applying a different resistive sequence to the scroll wheel includes creating the impression of the scroll wheel having different mechanical attributes.

30. The method of claim 27, wherein said step of rotating the scroll wheel about the scroll axis includes rotating the scroll wheel about an axis that is oriented generally parallel to the steering axis.

* * * * *